Oct. 9, 1962   R. B. BARNES ET AL   3,057,693
METHOD FOR MONITORING A COMPONENT OF MIXED GAS
STREAMS AND APPARATUS THEREFOR
Filed Sept. 2, 1960

*INVENTORS*
ROBERT BOWLING BARNES
RUSSELL D. DEWAARD
BY
ATTORNEY

United States Patent Office 3,057,693
Patented Oct. 9, 1962

3,057,693
METHOD FOR MONITORING A COMPONENT OF MIXED GAS STREAMS AND APPARATUS THEREFOR
Robert Bowling Barnes, Stamford, and Russell D. De Waard, Old Greenwich, Conn., assignors to Barnes Engineering Company, Stamford, Conn., a corporation of Delaware
Filed Sept. 2, 1960, Ser. No. 53,800
7 Claims. (Cl. 23—232)

This invention relates to a method for continuously determining the amounts of small quantities of one component of a gaseous mixture and to cells containing infrared detectors for use in such processes.

Many chemical reactions or physical separations involve the production of a continuous stream of mixed gaseous components and it is often necessary to determine the amounts of one component which may be present in the gaseous stream in relatively small amounts. A second requirement is that there should be an immediate and continuous response. Typical examples are the amount of water vapor in fluorocarbons which will be described in the specific example, oxygen using finely divided platinum as a catalyst, hydrogen, using finely divided palladium as a catalyst, hydrogen sulfide, using mercury on a porous substrate, and carbon dioxide, using sodium hydroxide or calcium oxide as a reagent.

It has been proposed in the past to determine the presence of small amounts of oxygen in a gas stream, for example hydrogen. The method used involves the rigorous pretreatment of a portion of the gas stream by very precise control of flow rate, several flow regulators in series being needed for the degree of precisions, and extensive chemical treatment to remove any traces of other chemicals. The precisely controlled flow then passes over a catalyst which is capable of bringing about the combustion of hydrogen and oxygen or similar fuel gases and oxygen at ordinary temperatures. A thermopile with a series of thermocouples is arranged with one set of junctions in the gases before they strike the catalyst and another set after. The voltage output of the thermopile constitutes the measuring signal. If all goes well and the flow is precisely regulated, a reliable indication is obtained and the instrument has useful sensitivity, about one part in 100,000 being claimed.

The prior measuring instrument is extremely sensitive to any fluctuation in flow and to any failure in complete cleaning of the gas from all catalyst poisons. If there is any failure in perfect control or perfect cleaning, the indication of the instrument is without practical significance.

Unfortunately, an instrument requiring this type of precision control can be used only in the laboratory and only when operated by highly skilled and very careful personnel. The needs of industry, however, are for indicating and/or measuring devices which operate in the plant under unfavorable environmental conditions and with no need for skillful operating personnel except for periodic maintenance. The present invention solves these problems and provides an instrument which combines high sensitivity with ruggedness, insensitivity to minor flow variations and, except for periodic maintenance, requires no supervision.

Essentially, the instrument used in the present invention and constituting a portion thereof is a differential infrared detector. A thermistor bolometer is preferred although other thermally responsive infrared detectors, such as thermocouples, may be built into installations of the present invention and are, of course, included in its broader aspects. The further description of the invention will be in terms of a thermistor bolometer which is the preferred type of infrared detector, it being understood that what is said is equally applicable to instruments using a different type of thermal detector.

A thermistor bolometer consists of two small flakes of material which shows a high temperature coefficient of resistance, for example oxides of nickel, manganese, and the like. In the ordinary thermistor bolometers for use in radiation detection, these two flakes are mounted in a suitable container and are connected in series, being supplied with a suitable bias voltage either A.C. or D.C. For radiation work one of the two thermistors is shielded from radiation and the other exposed and, if necessary, blackened in order to absorb more efficiently.

In the instruments of the present invention the container in which the thermistors are mounted is provided with inlet and outlet ports for receiving a small flow of a gas stream which is to be monitored. One or both of the flakes are covered with thin diaphragms of relatively inert material which is a good conductor of heat, for example phosphor bronze. The thermistor flakes are mounted on the diaphragms which may be in the form of tiny cups with suitable electrical insulation and form. If a thin diaphragm of a dielectric is used such as, for example fused aluminum oxide, beryllium oxide, and the like, the insulation is, of course, not needed. On one of the two diaphragms, or on the single one if only one is used, there is placed a small amount of a finely divided solid which reacts with the constituent in the gas stream which is to be monitored or which is a catalyst for the reaction of the constituent either with itself or with other constituents of the gas stream. The material used is one which reacts to produce a strongly exothermic or endothermic reaction or, in the case of a catalyst, catalyzes such a reaction.

The reaction of the constituent of the gas to be detected produces heat or removes it and so changes the temperature of the thermistor flake with which it is in heat conducting contact whereas the other flake adjusts itself to the average temperature of the gas stream. If there is none of the constituent to be monitored, the two flakes are at the same temperature and a signal taken from their junction will be zero. If there is any of the constituent to be monitored present in the gas stream, one of the flakes becomes hotter than the other and a signal results which, with conventional electronic processing, can be used for indicating, recording, alarm or control means.

The process and apparatus of the present invention possesses two features which are of vital importance to reliable and accurate operation. The first feature is that the instrument is practically insensitive to small changes in flow rate. The precision required in the past is not necessary. This does not mean that the instrument will give exactly the same response with enormous flow rate differences but all that is necessary is a moderate control of flow rate, for example within plus or minus 10 or 20 percent which can be effected with a single cheap, standard flow regulator. This permits operation practically in the unfavorable environment of a plant and takes the present instrument out of the scientific laboratory and puts it to work in practical industrial installations.

The second important factor is that the chemical reaction and its products do not contact the heat sensors themselves. This is of vital importance because if a reagent is used, it is finally exhausted and a residue remains which must be removed and a fresh charge substituted. If the reagent is in contact with the heat sensor, such an operation can be relied upon to ruin the instrument. Even when a catalyst is used, such as the one employed in the oxygen detector of the prior art described above, there is still the necessity either of removing the catalyst or of taking elaborate precautions to remove every possibility of catalyst poison from the gas stream. In the case of the present invention, a catalyst can be used for a long period of time until it becomes poisoned and then replaced with fresh material exactly as in the case of an actual chemical reagent.

As described above in cases with the monitoring of a single constituent in the gas stream, it may be considered that the present invention permits the production of a result which was qualitatively possible but by an enormously improved process, one that can be used in a plant without supervision and without skilled control.

In another aspect of the present invention an entirely new result can be obtained. It is possible to measure directly the difference in concentrations between two constituents. All that is necessary is to have cups or diaphragms over both detectors and put in one a chemical which reacts with or brings about reaction of one constituent of the gas stream, and in the other, a chemical which performs the same function for a second component. The output signal from the differential heat detector then measures the difference between the two constituents and by suitable electronic circuitry it is also possible to obtain an output signal which is proportional to other mathematical relationships of the two concentrations, such as their ratio. This is a function which cannot be performed by the prior art device described above and so it constitutes a new and novel result which is extremely useful. Here, as in the case of the detection of the presence of a single constituent, the same advantages are enjoyed, namely insensitiveness to small flow changes, ruggedness and usefulness under unfavorable environments with simple maintenance and replenishment of reagent.

If it is desired, the functions of monitoring for one constituent and determining relative concentrations of two can be combined either by providing two bolometers or by providing two sets of thermistor flakes in one bolometer, one set being provided with diaphragms as described in connection with single constituent detection, and the other as described immediately above.

While there is no criticality of flow rate for small changes, the instrument is more sensitive if slow flow rates are used. Very rapid flow rates introduce an error in that heat in the reagent reacting may be carried off in the gas stream. However, it is just very slow rates which are most difficult to control with complete precision. In the present invention, however, the relative insensitiveness to flow rate changes makes the very slow flow which permits maximum sensitivity both simple and reliable.

The invention will be described in greater detail in conjunction with drawings in which.

Figure 1:
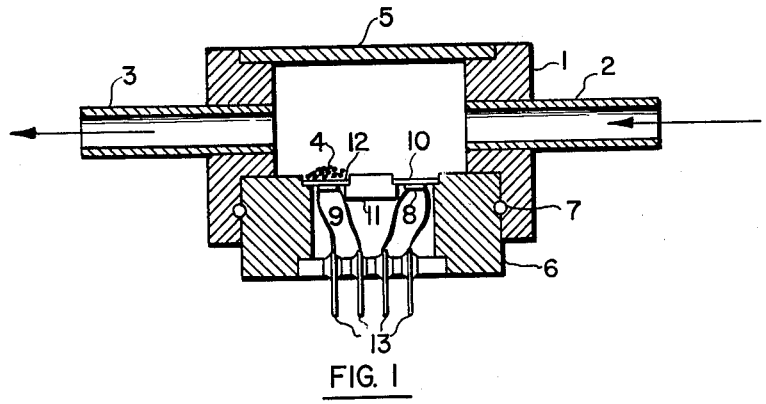
FIG. 1 is a cross-section through an instrument of the present invention.

In FIG. 1 there is shown a cell wall 1 which may advantageously be of stainless steel. It is provided with an inlet 2 and an outlet 3. Into the cell there fits the sensitive portion of a modified standard thermistor bolometer which is provided with an insulating support 6 maintained gas-tight by a circular gasket or O-ring 7. A removable cover is also provided for the cell. The bolometer proper consists of two thermistor flakes 8 and 9 which are attached through thin insulating films to phosphor bronze cups 10 and 12. The cups in turn are mounted in a plastic or ceramic holder 11. From the two thermistors wires lead to pins 13 and the whole instrument plugs into a standard bolometer cable (not shown).

The operation of the instrument is as follows, the illustration being the detection of small amounts of water in a stream of fluorocarbons: A small amount of finely powdered anhydrous calcium sulphate is placed on the cup 12, the other cup 10 being left bare. A slow and moderately controlled flow of a small portion of the stream of fluorocarbons enters through inlet 2. It encounters cup 10 and brings it, together with its attached thermistor flake 8 to the temperature of the slowly flowing gas stream. Then the stream, or a portion of it, encounters the calcium sulfate 4 and any water in the stream reacts therewith to produce the dihydrate. The reaction is strongly exothermic and heats up the thermistor 9. The gas stream then slowly passes out through outlet 3. As long as there is any anhydrous calcium sulfate left the temperature differential between thermistors 8 and 9 is maintained and the bolometer produces a signal which can be calibrated to read the amount of water present, for example in p.p.m.

Figure 2:
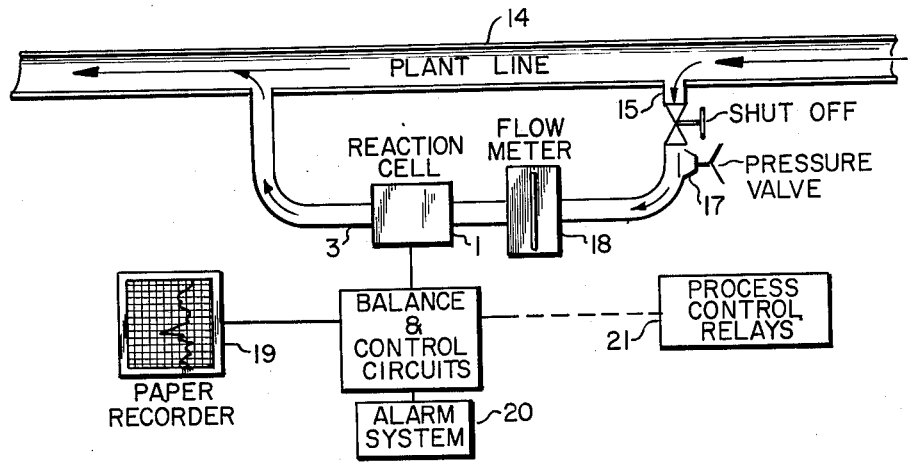
FIG. 2 is a diagrammatic illustration of an installation of the instrument of the present invention on a flowing gas line.

Turning to FIG. 2 it will be seen that the present invention can be incorporated in connection with a pipe 14 through which the gas stream to be monitored flows. A small portion passes through the pipe 5, the shut-off valve, 6, through a flow meter 18 and then through a reaction cell as described in conjunction with FIG. 1. The gases after passing through the cell rejoin the main stream. The output of the thermistor bolometer, after passing through conventional amplifying and processing circuits, may operate a recorder, shown diagrammatically at 19, an alarm system, shown diagrammatically at 20, or process control relays, shown at 21.

FIG. 2 is diagrammatic and for clarity the pipe through which a small amount in the gas stream is let off is shown enormously exaggerated. In many cases the amount of gas required can be a few p.p.m. or be per 100,000 of the gas stream. A very slow flow measurable in cc. per minute is all that is necessary. As a result, a single charge of calcium sulfate can be used for many hours or days without replenishment. The response is, for all practical purposes, constant with concentration over a flow variation of plus or minus 20% or more.

Figure 3:
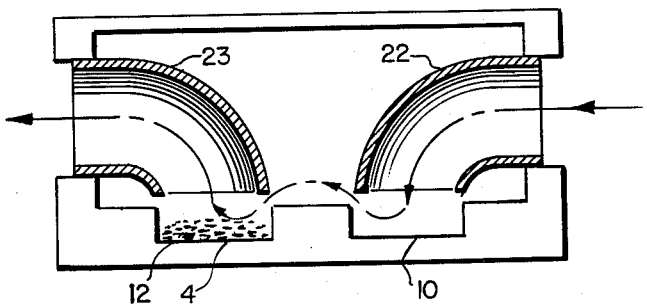
FIG. 3 is a section through a modified instrument provided with baffling.

With extremely slow flows which are desirable and useful in the present invention, there can be a slight risk that some of the heat evolved in the reacting calcium sulfate might pass back to the bare diaphragm 10. In such cases a modification of the cell may be used as is shown in FIG. 3 where two tubular baffles 22 and 23 direct the slow gas flow directly onto the bare diaphragm 10 and off from the diaphragm 12 carrying the reagent. With ordinary flows the baffles are not essential but, if it is desired to make the reacting chemical last as long as possible with extremely slow flows, the baffles give an added factor of safety.

The invention has been described with drawings illustrating thermistor bolometers. Of course, if thermocouples are used, one set of junctions are in heat exchange relation with one diaphragm and the other set with the other. It is an advantage of the present invention that it is not dependent on special thermal detectors and can be used with any suitable types.

The question of sensitivity sometimes involves a compromise. If a diaphragm of extreme thinness and good heat conductivity is used, the sensitivity of the instrument is increased. There is, however, a practical mechanical limit on the thinness of the diaphragms even if they are provided with stiffening ribs or other supporting structure. If the diaphragm is too thin, the removal of spent chemicals and replacing with a new charge presents some risk of rupture. With a chemical which reacts to form a material that adheres tightly to the film, this risk is greater. On the other hand, if the chemical reacts to form a powder which can be removed by gentle brushing with a soft camel's hair brush, much thinner diaphragms may be employed. The invention is not limited to any particular diaphragm thickness but permits a wide range of designs. Wherever the greatest sensitivity is not necessary, stiffer diaphragms are permissible and the illustrations and descriptions of the drawings are of an instrument with a rugged phosphor bronze diaphragm of sufficient thicknesses so that even fairly sticky reactive products can be removed with safety.

As will be noted from a consideration of FIG. 1, different thermistor bolometers can be plugged into the cell. This is of practical value where the instrument is to be used for various types of monitoring. Of course, where the installation is fixed, this feature is of less importance and, in such cases, diaphragm and thicknesses will be chosen for best overall operation in monitoring a particular gaseous component.

We claim:

1. A process for monitoring the relative amounts of reactive components in a mixed gaseous stream which comprises bringing at least a minute portion of said stream into intimate contact with at least two heat conducting diaphragms of negligible heat capacity inert to the gases each of which being conductively connected to a component of a differential heat detector, the diaphragms having different chemicals being placed thereon each reacting with one of the components of the gas stream uniquely to produce a change in heat and to produce reaction products which are non-corrosive to the diaphragms, whereby the differential detector produces an output which is a function of the relative concentration of the components in the gas stream.

2. A reaction cell for monitoring a component in a gas stream comprising in combination,
   (a) a cell body with an inlet and outlet for gases,
   (b) differential detectors responding to temperature and having two components the detectors having negligible heat capacity,
   (c) a heat conductive diaphragm of good heat conductivity and negligible heat capacity in heat exchanging contact with at least one component of the differential detectors,
   (d) said diaphragm being adapted to receive and retain thereon a small amount of chemical.

3. A reaction cell according to claim 2 in which there are provided two heat conductive diaphragms, each in contact with a detector component.

4. A reaction cell according to claim 3 in which the heat detector and heat conductive diaphragm are mounted on a plug removably fitted into said cell body.

5. A reaction cell according to claim 4 in which the differential heat detector comprises two thermistor flakes connected in series.

6. A reaction cell according to claim 2 in which the differential heat detector comprises two thermistor flakes connected in series.

7. A reaction cell according to claim 2 in which the diaphragm adapted to receive the small amount of the chemical is situated downstream in the cell.

References Cited in the file of this patent

UNITED STATES PATENTS

| | | |
|---|---|---|
| 2,444,613 | McCombie | July 6, 1948 |
| 2,743,167 | Cherry | Apr. 24, 1956 |
| 2,768,069 | Thompson | Oct. 23, 1956 |
| 2,916,358 | Valentine et al. | Dec. 8, 1959 |

FOREIGN PATENTS

| | | |
|---|---|---|
| 402,011 | Great Britain | Nov. 23, 1933 |